Figure 1:
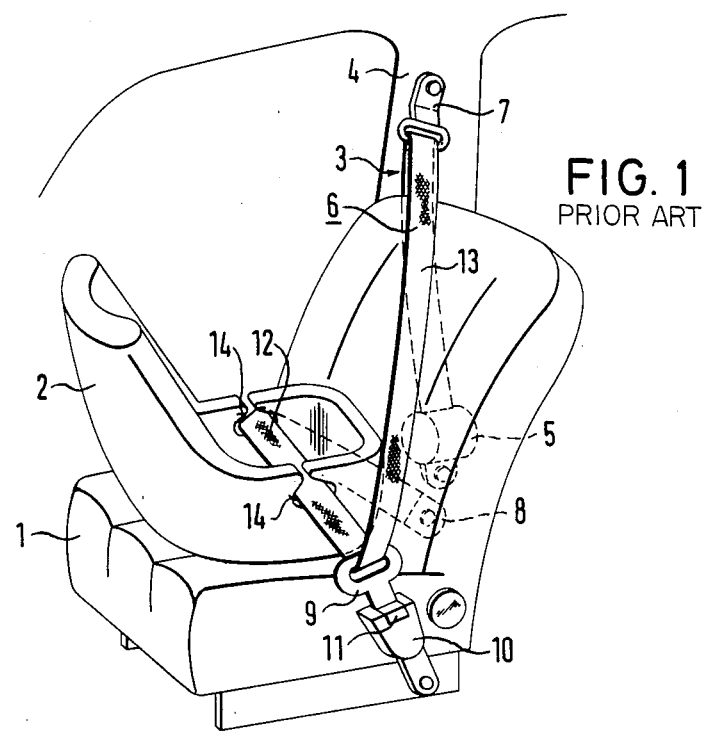

United States Patent [19]

Föhl

[11] Patent Number: 4,685,740
[45] Date of Patent: Aug. 11, 1987

[54] MEANS FOR SECURING A CHILD'S SEAT ON A VEHICLE SEAT BY MEANS OF A NORMAL THREE-POINT AUTOMATIC SAFETY BELT SYSTEM

[75] Inventor: Artur Föhl, Schorndorf, Fed. Rep. of Germany

[73] Assignee: TRW Repa GmbH, Alfdorf, Fed. Rep. of Germany

[21] Appl. No.: 866,061

[22] Filed: May 21, 1986

[30] Foreign Application Priority Data

May 30, 1985 [DE] Fed. Rep. of Germany ....... 3519322

[51] Int. Cl.⁴ .............................................. A47C 31/00
[52] U.S. Cl. .................................... 297/468; 297/216
[58] Field of Search ............... 297/468, 464, 216, 250, 297/483; 280/801, 808; 24/637, 640, 168, 171, 170

[56] References Cited

U.S. PATENT DOCUMENTS

| 4,372,012 | 2/1983 | Fohl ..................................... 297/483 |
| 4,461,510 | 7/1984 | Cunningham ......................... 297/216 |
| 4,500,133 | 2/1985 | Nakao .................................. 297/464 |
| 4,535,514 | 8/1985 | Grabowski ............................ 24/637 |

FOREIGN PATENT DOCUMENTS 3342594 5/1985 Fed. Rep. of Germany .

Primary Examiner—James T. McCall
Attorney, Agent, or Firm—Tarolli, Sundheim & Covell

[57] ABSTRACT

In a normal three-point automatic safety belt system the webbing is generally led from an end fitting secured to the vehicle over a guide fitting to a belt takeup means which is disposed on the same side of the vehicle seat as the guide fitting. Along the webbing a slide buckle can be displaced which can be releasably locked to a belt lock which is secured on the opposite side of the vehicle seat to the vehicle. When the slide buckle is inserted into the webbing it divides the latter into a lap portion and a shoulder portion. To secure a child's seat on the vehicle seat by means of such a normal three-point automatic safety belt system by the lap portion bearing on the child's seat the safety belt system is equipped with an additional clamping means which permits tightening of the lap portion but offers resistance to loosening of the lap portion. The clamping means can be formed by a securing slide buckle with clamping means which is arranged additionally to the normal slide buckle displaceably along the webbing and adapted to be locked selectively instead of the normal slide buckle in the belt lock, or it can be formed by a clamping member which to produce a clamping effect can be brought into engagement with the normal slide buckle.

5 Claims, 8 Drawing Figures

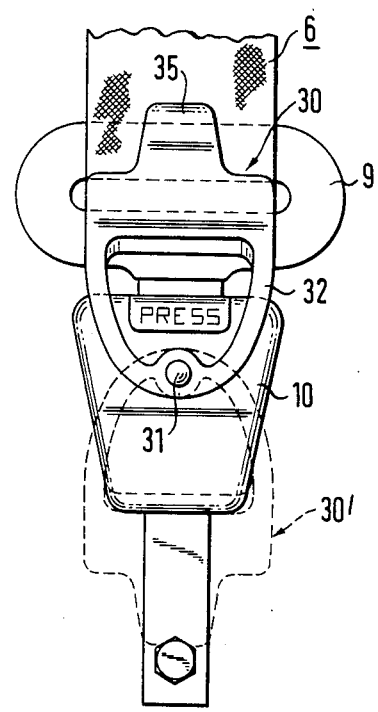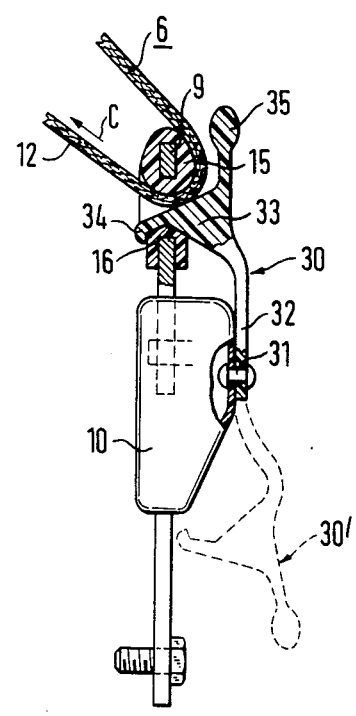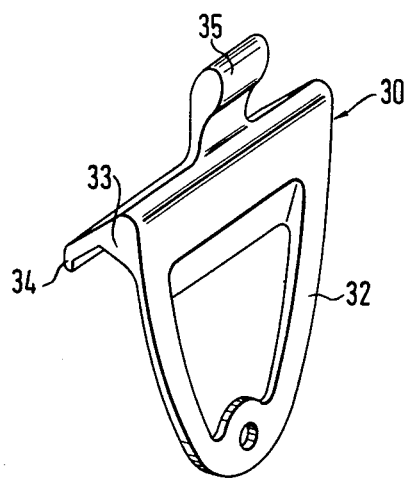

MEANS FOR SECURING A CHILD'S SEAT ON A VEHICLE SEAT BY MEANS OF A NORMAL THREE-POINT AUTOMATIC SAFETY BELT SYSTEM

The invention relates to a means for securing a child's seat on a vehicle seat by means of a normal three-point automatic safety belt system, the webbing of which is led from an end fitting secured to the vehicle, possibly over a guide fitting secured to the vehicle, to a belt takeup means and is divided by a slide buckle displaceable along the webbing into a lap portion and a shoulder portion when the slide buckle is detachably locked in a belt lock secured to the vehicle, the lap portion bearing on the child's seat disposed on the vehicle seat to secure said child's seat.

It is desirable and in many countries even prescribed by law for child's seats to be securable by means of the safety belt system installed in the vehicle in such a manner that when the vehicle is moving and in an accident they are securely held on the normal vehicle seat. This is done by means of the lap portion of the webbing bearing on the child's seat.

In the usual three-point automatic safety belt systems there is the problem that in normal operation if the blocking level of the automatic clamping means is not reached the webbing is not locked against loosening and the child's seat is not exactly fixed and, for example, when a curve is taken or the vehicle is braked slightly, the child's seat can move on the vehicle seat. The result of such a movement may be that in any subsequent accident the locking of the safety belt will not suffice to correctly secure the child's seat.

On the other hand, the means for securing the child's seat should be constructed such that it does not impair the normal use of the safety belt system for securing a vehicle occupant and in particular has no disadvantages as regards comfort, for example by increasing the retraction force at the belt takeup means, which would result in a higher pressure of the belt system on the body of the occupant.

The problem underlying the invention is the provision of a means with which a child's seat can be secured on the vehicle seat in normal operation by means of the lap portion of a normal three-point automatic safety belt system without the normal use of the safety belt system being impaired.

According to the invention this problem is solved in that the safety belt system is equipped with an additional clamping means which permits tightening of the lap portion and resists loosening of the lap portion.

The additional clamping means according to the invention is only used when the safety belt system serves to secure a child's seat. It is then possible to tighten the lap portion of the webbing bearing on the child's seat so that the latter is securely held and then fix the lap portion in this position by the clamping means. The holding effect is then independent of whether or not the webbing is locked by the automatic takeup means. The holding effect can be easily cancelled either by releasing the clamping means or by unlocking the belt lock.

A first advantageous embodiment of the invention resides in that the clamping means is formed by a securing slide buckle with clamping means displaceable along the webbing and lockable in the belt lock instead of the normal slide buckle.

In this embodiment the securing slide buckle is used only when the safety belt system is employed to secure a child's seat. For securing an occupant however a normal slide buckle is used so that for the occupant there is no difference compared with a conventional three-point automatic safety belt system.

A second advantageous embodiment of the invention includes a clamping member which can be brought into engagement with the normal slide buckle to produce a clamping effect.

In this embodiment the normal slide buckle is used both for securing an occupant and for securing a child's seat but the additional clamping member is used only when the child's seat is to be secured.

Figure 2:
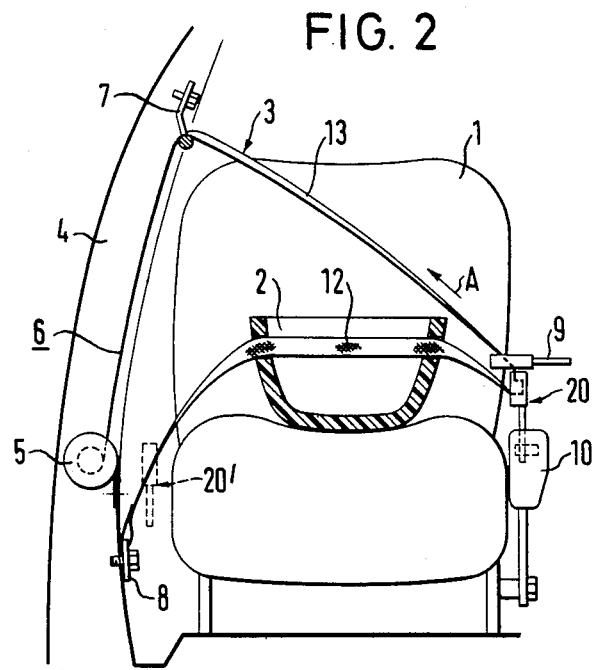
Figure 4:
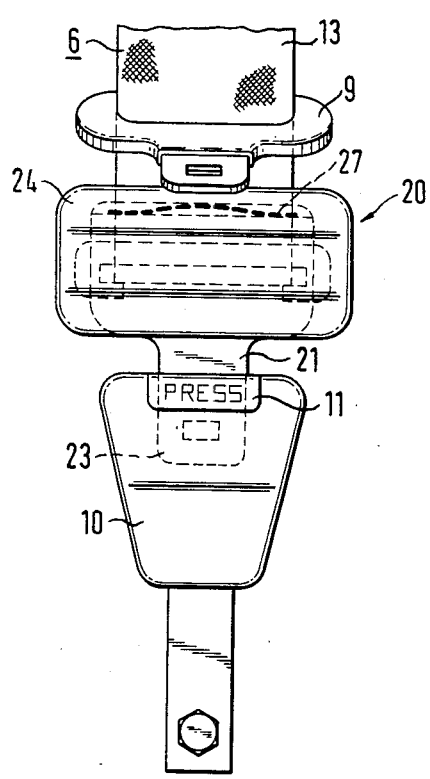
Figure 3:
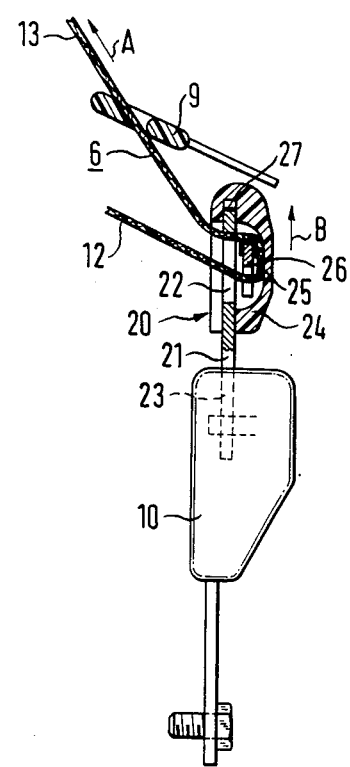
Figure 5:
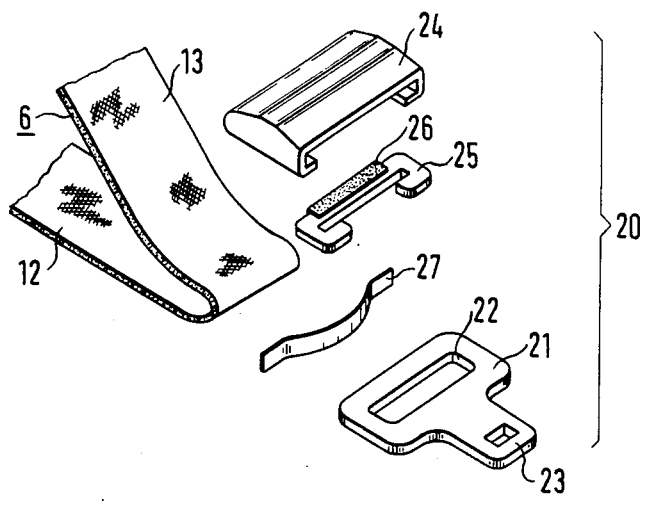

Further features and advantages of the invention will be apparent from the following description of embodiments illustrated in the drawings, wherein:

FIG. 1 shows in perspective view the securing of a child's seat on the passenger seat of a motor vehicle by means of a prior art three-point automatic safety belt system, FIG. 2 shows a partially sectioned front view of the arrangement of FIG. 1 with an additional clamping means in the form of a securing sliding buckle according to a first embodiment of the invention, FIG. 3 shows a sectional view of the securing slide buckle of FIG. 2 inserted into the belt lock, FIG. 4 is an end view of the arrangement of FIG. 3, FIG. 5 is an explosive view of the securing slide buckle of FIGS. 3 and 4, FIG. 6 is a partially sectioned side view of the clamping means according to a second embodiment of the invention, FIG. 7 is an end view of the arrangement of FIG. 6 and FIG. 8 is a perspective view of the clamping member of the clamping means of FIGS. 6 and 7.

FIG. 1 shows a vehicle seat 1 on which a child's seat 2 is placed. The child's seat 2 is held on the vehicle seat 1 by means of a three-point automatic safety belt system 3 of conventional design.

The safety belt system includes in the usual manner an automatic belt takeup means 5 fixedly attached in the lower region of the B post (the centre column) 4. The webbing 6 runs from the belt takeup means 5 over a guide fitting 7 secured in the upper region of the B post 4 to an end fitting 8 which is secured to the vehicle and to which the end of the webbing is secured. Between the guide fitting 7 and the end fitting 8 the webbing is led through the slot of a slide buckle 9 which is displaceable along this portion of the webbing 6. Integrally formed on the slide buckle 9 is a lock tongue which is insertable into a belt lock 10, the slide buckle thereby being locked in the belt lock 10. The unlocking is effected by a pushbutton 11 disposed on the belt lock 10.

When the slide buckle 9 is locked to the belt lock 10 as illustrated in FIG. 1 the webbing 6 is divided into a lap portion 12 extending between the end fitting 8 and the slide buckle 9 and a shoulder portion 13 extending between the slide buckle 9 and the guide fitting 7. The securing of the child's seat 2 is by the lap or pelvis portion 12. For this purpose on the child's seat 2 recesses 14 are formed with underhooks into which the lap portion 12 of the webbing 6 is inserted.

It can immediately be seen that the securing of the child's seat 2 illustrated in FIG. 1 by means of a normal three-point automatic safety belt system is only very inadequate if no additional measures are adopted. The tension force exerted in normal operation by the belt takeup means 5 on the webbing 6 is very small because of the wearing comfort desired. There is thus a danger that the child's seat 2 slips on the vehicle seat 1 as long as the blocking level of the automatic belt takeup means 5 is not reached.

FIG. 2 shows a first solution with which a reliable securing of the child's seat 2 on the vehicle seat 1 is achieved, the same conventional three-point automatic safety belt system being used as in FIG. 1. The corresponding parts are therefore provided with the same reference numerals as in FIG. 1.

The means of FIG. 2 differs from that of FIG. 1 only in that the safety belt system is equipped with an additional clamping means in the form of a securing slide buckle 20.

The securing slide buckle 20 is displaceable together with the normal slide buckle 9 on the webbing 6, the normal slide buckle 9 lying above the securing slide buckle 20. The securing slide buckle 20 is lockable in the same manner as the normal slide buckle 9 to the belt lock 10 and it is therefore possible to selectively insert into the belt lock 10 either the normal slide buckle 9 or the securing slide buckle 20.

To secure an occupant the normal slide buckle 9 is used. The securing slide buckle then hangs as illustrated in dashed lines in FIG. 2 at 20' unused above the end fitting 8 on the webbing where it does not interfere.

If however the safety belt system 3 is used to secure a child's seat 2 the securing slide buckle 20 is locked to the belt lock 10 as illustrated in full lines in FIG. 2. The normal slide buckle 9 then lies unused above the securing slide buckle 20.

The securing slide buckle 20 is so constructed that it permits a tightening of the lap portion 12 of the webbing but then offers a resistance by a clamping action to a loosening of the lap portion. Consequently, the child's seat 2 can be reliably secured on the vehicle seat 1 and the holding effect is retained until the clamping action is released irrespective of whether or not an arresting of the webbing by the automatic belt takeup means 5 takes place.

To facilitate handling the securing slide buckle 20 is preferably so constructed that it produces an automatic clamping acting only in one direction which can be released to release the child's seat. As a result the lap portion 12, after locking the securing slide buckle 20 in the belt lock 10 1,0 can be tightened by pulling at the shoulder portion 30 in the direction of the arrow A (FIG. 2), whereupon the automatic clamping subsequently prevents loosening of the lap portion 12. Various constructions of such securing slide buckles with automatic one-direction clamping are known which are suitable for this purpose. Principally, a distinction may be made between two types of such securing slide buckles.

In a first type the webbing is looped through the securing slide buckle in such a manner that in the position which the securing slide buckle assumes after insertion into the belt lock 10 a clamping acting in one direction is effected whilst after opening the lock the securing slide buckle can be pivoted into a position in which the clamping is released so that the securing slide buckle is displaceable in both directions along the webbing and can thus be easily returned to the starting position.

In a second type the securing slide buckle comprises a spring-loaded clamping element at the pass-through point which effects an automatic clamping acting in one direction and by actuating a grip means can be brought into a free-running position in which the webbing can be pulled through freely in both directions.

The example of embodiment of such a securing slide buckle 20 of the second type is illustrated in FIGS. 3 to 5 of the drawings. It comprises a load-takeup buckle member 21 which has substantially the form of a normal slide buckle with a passage slot 22 for the webbing and a lock tongue 23 insertable into the belt lock. The buckle member 21 is surrounded by a movable plastic slide 24 in which a clamping web 25 with a protection cover 26 is guided. The webbing 6 is inserted in the manner shown in FIG. 3 in the form of a loop through the passage slot 22 and round the clamping web 25. Between the buckle member 21 and the plastic slide 24 a leaf spring 27 is disposed which presses the plastic slide 24 with the clamping web 25 upwardly (in the direction of the arrow B in FIG. 3). As a result between the clamping member 25 and the slide member 21 a one-sided clamping action is exerted on the webbing and permits passage of the webbing 6 in the direction of the arrow A (FIG. 3) but prevents a pulling through of the webbing 6 in the opposite direction. By pressing on the plastic slide 24 against the direction of the arrow B this clamping is released so that the securing slide buckle can then be freely displaced along the webbing 6 in both directions.

In this embodiment the securing of the child's seat is effected in that the securing slide buckle 20 with depressed plastic slide 24 is inserted into the belt lock 10 after the lap portion 12 has been brought in the necessary manner into engagement with the child's seat 2. Thereafter the plastic slide 24 is released and the shoulder portion 13 of the webbing is pulled in the direction of the arrow A to tighten the lap portion 12. This tightening is thereafter maintained by the automatic one-sided clamping so that the child's seat 2 is reliably securely held on the vehicle seat 1. The normal slide buckle 9 lies in this position loosely above the securing slide buckle 20 as illustrated in FIGS. 3 and 4. To release the child's seat 2 the belt lock 10 is released. The securing slide buckle 20 can then be returned with depressed plastic slide 24 into the starting position so that the securing belt system can be used to secure an occupant by means of the normal slide buckle 9.

In FIGS. 6, 7 and 8 a second embodiment of the additional clamping means is illustrated. In this embodiment the normal slide buckle 9 is also used for securing the child's seat. Additionally, a clamping member 30 is provided which is only used when the child's seat is secured and in co-operation with the normal slide buckle 9 gives the desired clamping effect which prevents a loosening of the lap portion 12 of the webbing.

The clamping member 30 is pivotally secured by means of a pivot pin 31 formed for example by a rivet to the housing of the belt lock 10. The clamping member 30 consists of a resilient support 32 which in the example of embodiment illustrated has the form of a stirrup and of a wedge-shaped clamping web 33 with a hook-shaped extension 34. The clamping web 33 is formed on the carrier 32 in such a position that it is disposed at the level of the passage slot of the slide buckle 9 inserted into the belt lock 10 when the clamping member 30 is pivoted upwardly as illustrated in full lines in FIGS. 6 and 7. Furthermore, integrally formed on the clamping member 30 is a grip 35 which facilitates handling of said clamping member.

In normal operation when the safety belt system is to be used to secure an occupant the clamping member 30 hangs freely downwardly on the pivot pin 31 as illustrated in dashed line in FIGS. 6 and 7 at 30'.

To secure a child's seat firstly the normal slide buckle 9 is inserted into the belt lock 10 and the webbing 6 is tightened in the necessary manner. Then the clamping member 30 is pivoted upwardly by means of the grip 35 and the hook-shaped extension 34 is inserted through the passage slot of the slide buckle, the upper wedge faces of the clamping web 33 thereby coming to bear on the webbing so that the latter is firmly clamped between the slide buckle 9 and the clamping web 34. The clamping action can be improved by a suitable shaping of the plastic covering 15 of the slide buckle 9. For example, the plastic covering 15 may be formed in the lower region of the passage slot with a roof-shaped portion 16 over which the hook-shaped extension 34 engages so that the clamping web 33 is fixed with the necessary application force. If the inclination of the upper wedge faces of the clamping member 33 is kept very small when a load in the direction of the arrow C (FIG. 6) is applied a tightening clamping action is achieved so that the child's seat is additionally secured in an accident. To release the clamping action the clamping member 30 is brought by means of the grip 35 out of engagement with the slide buckle 9. On releasing the clamping member 30 automatically drops into the rest position for normal operation illustrated in dashed line in FIGS. 6 and 7.

The examples of embodiment previously described are of course not restricted to the securing of a child's seat on a front seat; they can be used in the same manner for securing child's seats in the rear of the vehicle.

I claim:

1. Apparatus for securing a child's seat on a vehicle seat by means of a three-point automatic safety belt system, the webbing of which is led from an end fitting secured to the vehicle over a guide fitting secured to the vehicle, to a belt takeup means and is divided by a slide buckle displaceable along the webbing into a lap portion and a shoulder portion when the slide buckle is detachably locked in a belt lock secured to the vehicle, the lap portion bearing on the child's seat disposed on the vehicle seat to secure said child's seat, and characterized in that the safety belt system is equipped with an additional clamping means which permits tightening of the lap portion and resists loosening of the lap portion.

2. Apparatus according to claim 1, characterized in that the clamping means produces an automatic clamping action in only one direction.

3. Apparatus according to claim 1 or 2, characterized in that the clamping means comprises a securing slide buckle having a clamping element and displaceable along the webbing and lockable in the belt lock instead of the slide buckle.

4. Apparatus according to claims 1 or 2, characterized in that the clamping means comprises a clamping member movable into engagement with the slide buckle to produce a clamping effect.

5. Apparatus according to claim 4, characterized in that the clamping member is pivotally attached to the belt lock.

* * * * *